(12) United States Patent
Bandy, III

(10) Patent No.: US 12,415,962 B2
(45) Date of Patent: Sep. 16, 2025

(54) SYSTEMS AND METHODS FOR PRODUCING AVIATION FUEL

(71) Applicant: MARATHON PETROLEUM COMPANY LP, Findlay, OH (US)

(72) Inventor: William Jennings Bandy, III, Findlay, OH (US)

(73) Assignee: Marathon Petroleum Company LP, Findlay, OH (US)

(*) Notice: Subject to any disclaimer, the term of this patent is extended or adjusted under 35 U.S.C. 154(b) by 0 days.

(21) Appl. No.: 18/919,759

(22) Filed: Oct. 18, 2024

(65) Prior Publication Data

US 2025/0154415 A1     May 15, 2025

Related U.S. Application Data

(60) Provisional application No. 63/548,081, filed on Nov. 10, 2023.

(51) Int. Cl.
    *C10G 69/02*      (2006.01)

(52) U.S. Cl.
     CPC ..... *C10G 69/02* (2013.01); *C10G 2300/1055* (2013.01); *C10G 2400/08* (2013.01)

(58) Field of Classification Search
     CPC ............ C10G 69/02; C10G 2300/1055; C10G 2400/08
     See application file for complete search history.

(56) References Cited

U.S. PATENT DOCUMENTS

| | | |
|---|---|---|
| 981,434 A | 1/1911 | Lander |
| 1,526,301 A | 2/1925 | Stevens |
| 1,572,922 A | 2/1926 | Govers et al. |
| (Continued) | | |

FOREIGN PATENT DOCUMENTS

| | | |
|---|---|---|
| AT | 11772 U1 | 4/2011 |
| BR | PI0701518 | 11/2008 |
| (Continued) | | |

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.

(Continued)

*Primary Examiner* — Randy Boyer
*Assistant Examiner* — Juan C Valencia
(74) *Attorney, Agent, or Firm* — Ray Quinney & Nebeker P.C.; Paul N. Taylor

(57) ABSTRACT

Embodiments of systems and methods to produce aviation fuel are disclosed. An example of a method to produce aviation fuel includes fractionating a renewable diesel feedstock in a fractionator to produce a $C_{8-}$ fraction, a $C_{8-18}$ fraction, and a $C_{18+}$ fraction. Additionally, the method includes providing the $C_{8-18}$ fraction to an isomerization reactor to produce an aviation fuel product. The method includes supplying at least a portion of the $C_{18+}$ fraction to a hydrocracking reactor to produce a hydrocracked product. The method further includes recycling at least a portion of the hydrocracked product to the fractionator for fractionating along with the renewable diesel feedstock.

20 Claims, 6 Drawing Sheets

(56) References Cited

U.S. PATENT DOCUMENTS

| | | |
|---|---|---|
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,664,744 A | 1/1954 | Bilhartz et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,798,463 A | 1/1989 | Koshi |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,928,760 A | 5/1990 | Freitas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |

(56) References Cited

U.S. PATENT DOCUMENTS

| | | |
|---|---|---|
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,040,186 A | 3/2000 | Lewis |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,100,975 A | 8/2000 | Smith et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |

(56) References Cited

U.S. PATENT DOCUMENTS

| | | |
|---|---|---|
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 | 7/2003 | Williams |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |

(56) References Cited

U.S. PATENT DOCUMENTS

| | | |
|---|---|---|
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 9,988,585 B2 | 6/2018 | Hayasaka et al. |
| 10,018,458 B2 | 7/2018 | Wade et al. |
| 10,047,299 B2 | 8/2018 | Rubin-Pitel et al. |
| 10,048,100 B1 | 8/2018 | Workman, Jr. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,200,489 B2 | 12/2021 | Cohen et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,494,651 B2 | 11/2022 | Mukund et al. |
| 11,542,441 B2 | 1/2023 | Larsen et al. |
| 11,574,192 B2 | 2/2023 | Cohen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,886,154 B2 | 1/2024 | Mukund et al. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 11,993,751 B2 | 5/2024 | Jagnanan et al. |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 12,039,446 B2 | 7/2024 | Cohen et al. |
| 12,049,592 B2 | 7/2024 | Clark et al. |
| 12,066,800 B2 | 8/2024 | Salhov et al. |
| 12,163,878 B2 | 12/2024 | Bledsoe, Jr. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |

(56) References Cited

U.S. PATENT DOCUMENTS

| | | |
|---|---|---|
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169064 A1 | 8/2006 | Anschutz et al. |
| 2006/0169305 A1 | 8/2006 | Jansen et al. |
| 2006/0210456 A1 | 9/2006 | Bruggendick |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0033570 A1 | 2/2015 | Bernabe |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |

(56) References Cited

U.S. PATENT DOCUMENTS

| | | |
|---|---|---|
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0311547 A1 | 10/2020 | Mukund et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0096518 A1 | 4/2021 | Ilani et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253956 A1 | 8/2021 | Jagnanan et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0348066 A1 | 11/2021 | Clark et al. |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0235647 A1 | 7/2022 | Haque et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0299952 A1 | 9/2022 | Salhov et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0037667 A1 | 2/2023 | Mukund et al. |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1* | 8/2023 | Whikehart ............ G01N 33/225 700/240 |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0002737 A1* | 1/2024 | Xu ............................ C10L 1/08 |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0182803 A1 | 6/2024 | Woodchick |
| 2024/0189753 A1 | 6/2024 | Esquivel |
| 2024/0294837 A1 | 9/2024 | Larsen |
| 2024/0327723 A1 | 10/2024 | Larsen |
| 2024/0337352 A1 | 10/2024 | Craig |
| 2024/0377287 A1 | 11/2024 | Markins |
| 2024/0399279 A1 | 12/2024 | Duong |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 205066647 | 3/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |
| CN | 111336612 A | 6/2020 |
| CN | 213762571 U | 7/2021 |

(56) References Cited

FOREIGN PATENT DOCUMENTS

| | | |
|---|---|---|
| CN | 213824075 U | 7/2021 |
| CN | 213841995 | 7/2021 |
| CN | 214619622 | 11/2021 |
| CN | 215263512 U | 12/2021 |
| CN | 215288592 | 12/2021 |
| CN | 113963818 | 1/2022 |
| CN | 114001278 | 2/2022 |
| CN | 216205767 | 4/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 1488173 S | 1/2014 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |
| WO | WO-2024227723 A2 * | 11/2024 ............. C10G 50/00 |

OTHER PUBLICATIONS

Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.

Lerh et al., Feature: IMO 2020 draws more participants into Singapore's bunkering pool., S&P Global Platts, www.spglobal.com, Sep. 3, 2019.

Cremer et al., Model Based Assessment of the Novel Use of Sour Water Stripper Vapor for NOx Control in CO Boilers, Industrial Combustion Symposium, American Flame Research Committee 2021, Nov. 19, 2021.

Frederick et al., Alternative Technology for Sour Water Stripping, University of Pennsylvania, Penn Libraries, Scholarly Commons, Apr. 20, 2018.

Da Vinci Laboratory Solutions B. V., DVLS Liquefied Gas Injector, Sampling and analysis of liquefied gases, https://www.davinci-ls.com/en/products/dvls-products/dvls-liquefied-gas-injector.

Wasson ECE Instrumentation, LPG Pressurization Station, https://wasson-ece.com/products/small-devices/lpg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

Zulkefi et al., Overview of H2S Removal Technologies from Biogas Production, International Journal of Applied Engineering Research ISSN 0973-4562, vol. 11, No. 20, pp. 10060-10066, © Research India Publications, 2016.

Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

Lloyd's Register, Using technology to trace the carbon intensity of sustainable marine fuels, Feb. 15, 2023.

"Development of Model Equations for Predicting Gasoline Blending Properties", Odula et al., American Journal of Chemical Engineering, vol. 3, No. 2-1, 2015, pp. 9-17.

(56) References Cited

OTHER PUBLICATIONS

Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Platvoet et al., Process Burners 101, American Institute of Chemical Engineers, Aug. 2013.
Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.

(56) References Cited

OTHER PUBLICATIONS

Okonkwo et al., Selective removal of hydrogen sulfide from simulated biogas streams using sterically hindered amine adsorbents, Chemical Engineering Journal 379, pp. 122-349, 2020.

* cited by examiner

SYSTEMS AND METHODS FOR PRODUCING AVIATION FUEL

CROSS REFERENCE TO RELATED APPLICATIONS

This application claims priority to, and the benefit of U.S. Provisional Application No. 63/548,081, filed Nov. 10, 2023, titled "SYSTEMS AND METHODS FOR PRODUCING AVIATION FUEL," the disclosure of which is incorporated herein by reference in its entirety.

TECHNICAL FIELD

The disclosure is generally related to aviation fuel. More specifically, the disclosure relates to systems and methods for producing aviation fuels, such as synthetic paraffinic kerosene (SPK) or sustainable aviation fuel (SAF).

BACKGROUND

An increasing number of facilities are implementing renewable feedstock or materials to provide sustainable transportation fuels, which may include a reduced environmental impact compared to fossil-based fuels. Certain aviation fuels may be developed from renewable feedstocks to include chemical properties suitable for powering aircrafts. In some cases, these fuels are referred to as synthetic paraffinic kerosene (SPK), which can be used directly as a sustainable aviation fuel (SAF) or blended with any other fuel or product to produce SAF having desired properties. Traditional process flow schemes for creating aviation fuel include directing a feedstock into an isomerization unit, then a fractionation unit, and then a hydrocracking unit. This process flow therefore directs all compounds of the feedstock directly into the isomerization unit, including large-size compounds that are subsequently cracked in the hydrocracking unit for size reduction. Isomerization of these compounds negatively contribute to the operating conditions and design considerations of various components, such as the hydrocracking unit. For example, certain situations necessitate management of molecular sizes and freeze points of the various compounds for both the isomerization unit and the hydrocracking unit, which are overly complex and problematic. Moreover, single pass hydrocracking in the traditional process flow schemes require removal of a drag stream of unconverted compounds that are too large or otherwise unsuitable for jet fuel use. The drag stream, which may be supplied or retailed as renewable diesel, further reduces yield or efficiency of aviation fuel production.

SUMMARY

Accordingly, Applicant has recognized a need for systems and methods to provide enhanced yield of aviation fuel from a renewable diesel feedstock. The present disclosure is directed to embodiments of systems and methods for producing aviation fuel.

Embodiments of refining systems disclosed herein include a configuration of process units for an enhanced yield of aviation fuel, such as synthetic paraffinic kerosene (SPK) or sustainable aviation fuel (SAF). In some examples, SPK is a blendstock that is blended with an aromatic-rich fuel according to one or more ASTM standards to produce SAF having specified properties. For example, the SPK may be blended with a sustainably sourced fuel and/or a petroleum-derived fuel to produce SAF that includes a threshold content of aromatic compounds therein. As used herein, the aviation fuel produced according to the present techniques refers to any suitable SPK, SAF, or renewable jet fuel that includes physical and chemical properties suitable for aviation use. The presently disclosed refining systems provide a disruption and reversal of the conventional order of dewaxing reactions (hydrocracking and isomerization) and the fractionator to provide a more efficient processing of the feedstock. The systems facilitate simpler and potentially lower severity in operation of the hydrocracking and isomerization units for increased yield. For example, compounds that are outside the boiling point ranges of aviation fuel are recycled to extinction, thereby providing aviation fuel as one of the main distillate products. In certain examples, the aviation fuel is the main distillate product. In an example, the system includes the fractionator and hydrocracking reactor being positioned upstream of the isomerization reactor to drive product separation; thereby providing only specific, targeted compounds to each reaction step. In certain examples, this configuration reduces over-cracking that produces undesired light ends, maximizing the aviation fuel yield. The configuration also enables each reaction step (hydrocracking and isomerization) to have a focused processing operation. The refining systems and methods disclosed herein separate normal alkanes into fractions that are supplied to their respective upgrading processes to modify molecular sizes and qualities for increased production of aviation fuel.

An embodiment of the disclosure is directed to a method to produce aviation fuel. The method may include fractionating a renewable diesel feedstock in a fractionator to produce a $C_{8-}$ fraction, a $C_{8-18}$ fraction, and a $C_{18+}$ fraction. The $C_{8-}$ fraction is further processed to produce naphtha, LPG, or fuel gas (collectively referred to as light ends). Additionally, the method includes providing the $C_{8-18}$ fraction to an isomerization reactor to produce an aviation fuel product. The method also includes supplying at least a portion of the $C_{18+}$ fraction to a hydrocracking reactor to produce a hydrocracked product and recycling at least a portion of the hydrocracked product to the fractionator for fractionating along with the renewable diesel feedstock.

In another example, the renewable diesel feedstock includes a hydrodeoxygenated renewable diesel. In another example, the renewable diesel feedstock contains normal alkanes produced by hydrodeoxygenation of glycerides. In another example, the method may further include hydrotreating a renewable feedstock containing triglycerides, triglyceride derivatives, or a combination thereof in a hydrogen-rich atmosphere to produce the renewable diesel feedstock.

In another example, the method may further include mixing the hydrocracked product with the renewable diesel feedstock directly upstream of the fractionator. In another example, the renewable diesel feedstock is supplied to a first inlet of the fractionator and the at least a portion of the hydrocracked product is supplied to a second inlet of the fractionator. In another example, the recycling at least a portion of the hydrocracked product to the fractionator further includes recycling an entirety of the hydrocracked product. In another example, the method may further include producing an additional $C_{8-}$ fraction in the isomerization reactor, providing the aviation fuel product and the additional $C_{8-}$ fraction to a separator to separate the aviation fuel product from the additional $C_{8-}$ fraction. The method may include recycling the additional $C_{8-}$ fraction to the fractionator. The method may include further processing of the $C_{8-}$ fraction to produce a plurality of light ends. In another example, the method may further include selecting an operating temperature of the hydrocracking reactor. The operating temperature may be lower than an operating temperature of a hydrocracking reactor positioned downstream of a reference isomerization reactor.

Another embodiments of the disclosure is directed to a method to produce aviation fuel. The method may include supplying a hydrodeoxygenated renewable diesel feedstock to a fractionator. The method includes fractionating the hydrodeoxygenated renewable diesel feedstock into a $C_{8-}$ fraction, a $C_{8-18}$ fraction, and a $C_{18+}$ fraction. The method includes providing the $C_{8-18}$ fraction to an isomerization reactor to produce an aviation fuel product. The method includes supplying at least a portion of the $C_{18+}$ fraction to a hydrocracking reactor to produce a hydrocracked product. The hydrocracking reactor is configured to crack one or more heavy compounds of the $C_{18+}$ fraction into two or more lighter compounds. The method also includes recycling at least a portion of the hydrocracked product to the fractionator.

In another example, the method may further include hydrodeoxygenating a triglyceride feedstock to produce the hydrodeoxygenated renewable diesel feedstock. In another example, the method may further include producing an additional $C_{8-}$ fraction in the isomerization reactor, providing the aviation fuel product and the additional $C_{8-}$ fraction to a separator to separate the aviation fuel product from the additional $C_{8-}$ fraction, and recycling the additional $C_{8-}$ fraction to the fractionator.

Another embodiment of the disclosure is directed to a system to produce an aviation fuel. The system includes a fractionator having a first inlet to receive a renewable diesel feedstock, a first outlet, a second outlet, and a third outlet. The fractionator is configured to fractionate the renewable diesel feedstock into a $C_{8-}$ fraction output that exits through the first outlet, a $C_{8-18}$ fraction output to the second outlet, and a $C_{18+}$ fraction output to the third outlet. The system also includes a hydrocracking reactor having a second inlet and a fourth outlet. The second inlet is connected to and in fluid communication with the third outlet to receive the $C_{18+}$ fraction. The hydrocracking reactor is configured to hydrocrack the $C_{18+}$ fraction into a hydrocracked product. The fourth outlet is in fluid communication with the fractionator and facilitates recycling of the hydrocracked product to the fractionator. Additionally, the system may include an isomerization reactor having a third inlet and a fifth outlet. The third inlet may be connected to and in fluid communication with the second outlet to receive the $C_{8-18}$ fraction. The isomerization reactor may be operable to isomerize the $C_{8-18}$ fraction and supply an aviation fuel product as output through the fifth outlet.

In certain examples, the renewable diesel feedstock contains normal alkanes produced by hydrodeoxygenation of glycerides, free fatty acids, or combinations thereof. In some examples, a majority of the hydrodeoxygenated renewable diesel contains $C_{16}$ and $C_{18}$ normal alkanes. In some examples, the system may include a separator having a fifth inlet connected to and in fluid communication with the fifth outlet, a sixth outlet to supply an additional $C_{8-}$ fraction to the fractionator, and a seventh outlet to output the aviation fuel product. In another example, the fourth outlet is connected to and in fluid communication with the first inlet or an additional inlet of the fractionator. In another example, the system may include a hydrogen source connected to and in fluid communication with the hydrocracking reactor, the isomerization reactor, or both.

In some examples, the system may include a controller in signal communication with the fractionator, the hydrocracking reactor, and the isomerization reactor. The controller may be configured to transmit signals to one or more of the fractionator, the hydrocracking reactor, and the isomerization reactor to adjust production of the aviation fuel product. In some examples, the controller is configured to adjust operation of the fractionator, the hydrocracking reactor, or both in response to detecting that the isomerization reactor is deviating from one or more preselected operating parameter ranges.

Another embodiment of the disclosure is directed to a controller to produce aviation fuel. The controller includes a memory storing processor-executable instructions. The controller also includes one or more processors communicatively coupled to the memory and configured to execute the processor-executable instructions from the memory. The one or more processors are configured, when executing the instructions, to transmit first signals to one or more first actuators associated with a fractionator to control operation thereof. The first signals cause the fractionator to fractionate a renewable diesel feedstock to produce a $C_{8-}$ fraction, a $C_{8-18}$ fraction, and a $C_{18+}$ fraction. The one or more processors are configured, when executing the instructions, to transmit second signals to one or more second actuators associated with an isomerization reactor to control operation thereof. The second signals cause the isomerization reactor to receive the $C_{8-18}$ fraction and produce an aviation fuel product. Additionally, the one or more processors are configured, when executing the instructions, to transmit third signals to one or more third actuators associated with a hydrocracking reactor to control operation thereof. The third signals cause the hydrocracking reactor to receive at least a portion of the $C_{18+}$ fraction, produce a hydrocracked product, and direct at least a portion of the hydrocracked product in a recycle stream to the fractionator for fractionating along with the renewable diesel feedstock.

In certain examples, the one or more processors are configured, when executing the instructions, to control operation of the fractionator to within one or more first preselected operating parameter ranges, control operation of the isomerization reactor to within one or more second preselected operating parameter ranges, and control operation of the hydrocracking reactor to within one or more third preselected operating parameter ranges.

In some examples, the one or more processors are configured, when executing the instructions, to adjust operation of the hydrocracking reactor in response to detecting that the fractionator is deviating from the first preselected operating parameter ranges, and adjust operation of the fractionator in response to detecting that the hydrocracking reactor is deviating from the third preselected operating parameter ranges. In an example, the one or more processors are configured, when executing the instructions, to adjust operation of the fractionator, the hydrocracking reactor, or both in response to detecting that the isomerization reactor is deviating from the second preselected operating parameter ranges.

In certain examples, the one or more processors are configured, when executing the instructions, to update one or more of the first preselected operating parameter ranges, the second preselected operating parameter ranges, and the third preselected operating parameter ranges in response to receiving a respective, modified operating parameter range from an authorized computing device.

In another example, the controller is in signal communication with one or more sensors configured to provide sensor data associated with one or more operating parameters of the fractionator, the isomerization reactor, and the hydrocracking reactor. In some examples, one or more of the first actuators, the second actuators, and the third actuators include a control valve, a pump, a compressor, a heating element, or an electrical switch.

Still other aspects and advantages of these and other examples are discussed in detail herein. Moreover, it is to be understood that both the foregoing information and the following detailed description provide merely illustrative examples of various aspects and examples and are intended to provide an overview or framework for understanding the nature and character of the claimed aspects and examples. Accordingly, the advantages and features of the present disclosure will become more apparent through reference to the following description and the accompanying drawings. Furthermore, it is to be understood that the features of the various examples described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several examples of the disclosure and, therefore, are not to be considered limiting of the scope of the disclosure.

DETAILED DESCRIPTION

Figure 1:
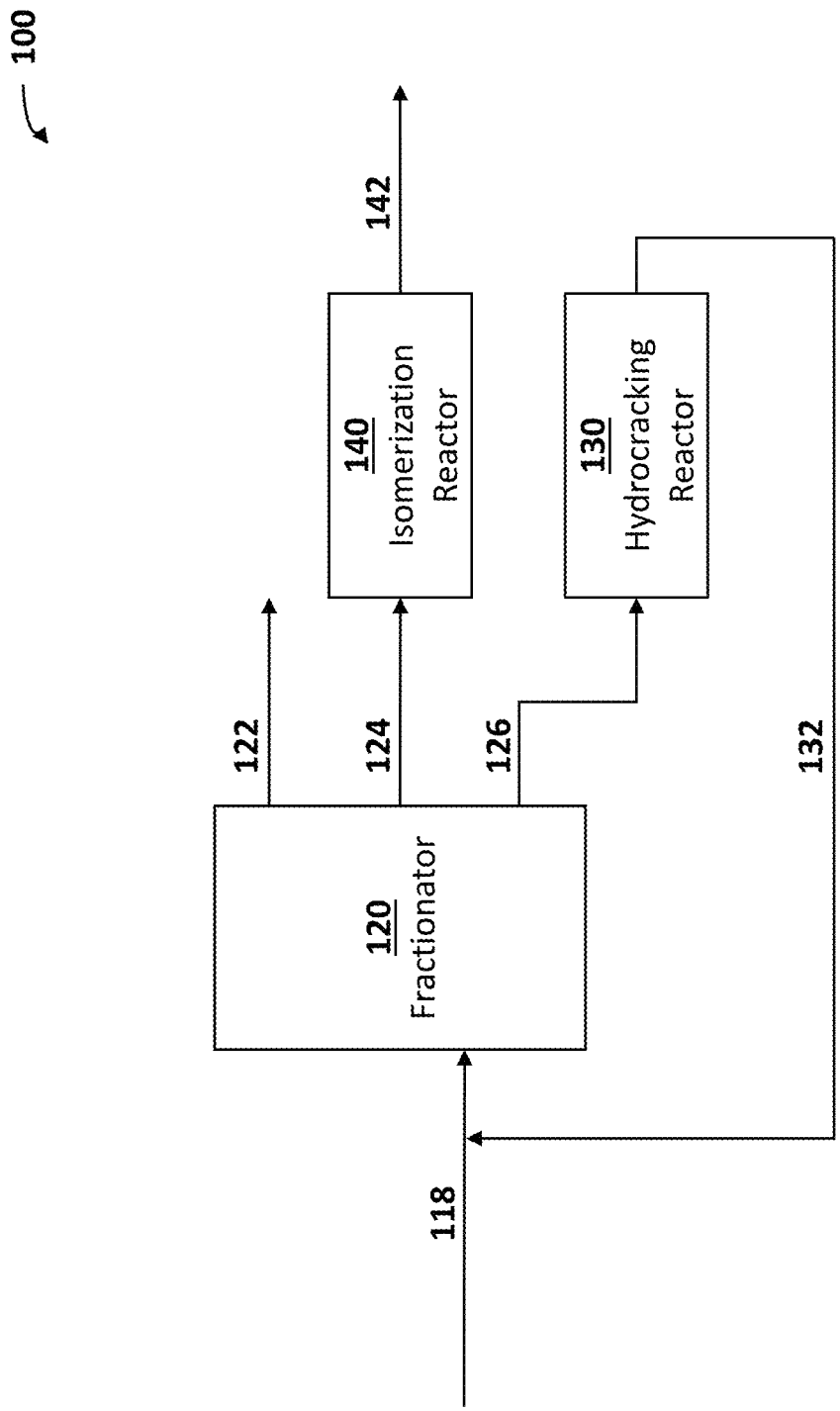
FIG. 1 is a schematic diagram of a refining system for producing aviation fuel according to embodiments of the disclosure.

So that the manner in which the features and advantages of the examples of the systems and methods disclosed herein, as well as others, which will become apparent, may be understood in more detail, a more particular description of examples of systems and methods briefly summarized above may be had by reference to the following detailed description of examples thereof, in which one or more are further illustrated in the appended drawings, which form a part of this specification. It is to be noted, however, that the drawings illustrate only various examples of the examples of the systems and methods disclosed herein and are therefore not to be considered limiting of the scope of the systems and methods disclosed herein as it may include other effective examples as well.

As used herein, the term "$C_{x-y}$ compounds," in which x and y are positive integer values, refers to hydrocarbon-based compounds, each compound containing between x and y carbon atoms, x and y inclusive. For example, a $C_{3-5}$ fraction or stream refers to a mixture that substantially contains or entirely contains hydrocarbon-based compounds, each compound containing 3, 4, or 5 carbon atoms. Additionally, it may be noted that, in certain cases, a $C_{x-y}$ fraction may not include a respective compound having each of the referenced integer values. As one example, a $C_{4-8}$ fraction can be a stream that contains compounds of 4, 5, and 7 carbon atoms, without any compounds of 6 or 8 carbon atoms. As used herein, the term "$C_{x+}$ compounds," in which x is a positive integer value, refers to hydrocarbon-based compounds, each compound containing at least x carbon atoms. For example, a $C_{3+}$ fraction refers to a mixture that substantially contains or entirely contains hydrocarbon-based compounds, each compound containing 3 or more (e.g., 3, 4, 5, 6, and so forth) carbon atoms.

As used herein, the term "$C_{x-}$ compounds," in which x is a positive integer value, refers to hydrocarbon-based compounds, each compound containing no more than x carbon atoms. For example, a $C_{4-}$ fraction refers to a mixture that substantially contains or entirely contains hydrocarbon-based compounds, each compound containing 4, 3, 2, or 1 carbon atoms. It may be noted that, in certain cases, a "$C_{x-}$ fraction" may also include hydrogen ($H_2$), in addition to hydrocarbons having x or fewer carbon atoms. The term "substantially contains" means that the mixture includes more than 50%, or at least 51%, or at least 60%, or at least 70%, or at least 80% by weight of the relevant hydrocarbon-based compounds.

As used herein, the terms "hydrocracking reactor" and "isomerization reactor" can each refer to an area including one or more units, zones, or sub-zones, which can each perform a respective unit operation and collectively operate as a reactor. The reactors can include one or more reactors or reactor vessels, separators, strippers, flash drums, extraction columns, fractionation columns, heaters, coolers, exchangers, pipes, pumps, compressors, and controllers. As an example, a hydrocracking reactor or an isomerization reactor can include one or more heaters, one or more coolers, one or more separators, and/or a stripper. Additionally, a unit, such as a reactor, dryer, or vessel, can further include one or more zones or sub-zones that contain various equipment. In examples, a flash drum or flash includes relatively simple equipment to facilitate efficient separations between hydrocarbon-based compounds supplied thereto. In examples, a stripper includes more complex equipment than a flash drum and receives a stripping gas that facilitates more precise separations between hydrocarbon-based compounds supplied thereto. As used herein, the term "aviation fuel" refers to any suitable synthetic paraffinic kerosene (SPK), sustainable aviation fuel (SAF), or renewable jet fuel.

As transportation industries move to reduce their carbon footprints, sustainable transportation fuels are becoming even more significant. To this end, certain facilities may implement renewable feedstocks as a replacement for all or a portion of petroleum products that are included in transportation fuels. For example, SAF or an SPK constituent thereof may be produced from a growing list of renewable or sustainable resources, such as fats, oils, greases, grains, seeds, waste streams, and so forth. However, in the emerging sustainability-focused environment, a low or insufficient yield of useable fuels may be produced from current refining practices of sustainable resources, thus increasing the amount of the resources that are utilized. As such, Applicant has recognized a need for systems and methods to provide aviation fuel at enhanced yields and efficiency, such as by improving or optimizing a configuration of unit operations for sustainable refining systems.

In some embodiments, renewable diesel for aviation fuel production may be produced by hydrotreating renewable feedstocks containing triglycerides such as fats, oils, or greases, and free fatty acids derived from those triglycerides. Certain hydrodeoxygenation (HDO) reactions produce renewable diesel that may primarily contain $C_{16}$ and $C_{18}$ normal alkanes. Competing reactions may also produce byproducts including $C_{15}$ and $C_{17}$ normal alkanes. Minor byproducts of $C_{14-}$ and $C_{19+}$ normal alkanes may also be formed during HDO reactions, depending upon the fatty acid distributions of the renewable feedstocks used. The resulting HDO renewable diesel feedstock or mixture may be processed into aviation fuel by (1) fractionating compounds having a proper boiling point for aviation fuel use (nominally $C_{8-18}$ compounds) from smaller $C_{8-}$ compounds and larger $C_{18+}$ compounds in the mixture, and (2) isomerizing aviation fuel-range compounds to lower a freeze point of the mixture to suitable levels within existing and/or renewable aviation fuel specifications.

Embodiments of refining systems disclosed here position a fractionator as a front unit in the system, rather than at the end, for better flow management and efficient separation of the desired aviation fuel product from compounds that are too small or too large to be used as aviation fuel. Material that includes a higher boiling point than aviation fuel, such as a $C_{18+}$ fraction, is obtained as the bottom product from the fractionator. This configuration of the refining system thus directs only the $C_{18+}$ fraction to the hydrocracking reactor. As presently recognized, the yield of aviation fuel can be maximized by hydrocracking those $C_{18+}$ compounds into a plurality of aviation fuel range compounds and smaller compounds corresponding to a naphtha, liquefied petroleum gas (LPG), and/or fuel gas size range, also denoted as light ends. In other words, the $C_{18+}$ fraction may be fed or supplied to a hydrocracking reactor to crack it into a $C_{8-18}$ product in the aviation fuel range and a lighter $C_{8-}$ compound in the light end range.

In some embodiments, the hydrocracked products from the hydrocracking step are recycled to the fractionator as feed. Thus, the $C_{18+}$ compounds that are too large for use as aviation fuel can be recycled to extinction, thereby converting substantially all feedstock into an aviation fuel or lighter products that may have higher value. Additionally, the normal alkanes of the $C_{18+}$ fraction, having not been processed within the isomerization reactor, may diffuse into and out of the pores of a zeolite hydrocracking catalyst easier than the corresponding branched compounds. This efficiency enables lower cracking temperatures to perform compound size reduction, compared to prior art systems without the present unit configuration. In other words, the refining system may increase or maximize aviation fuel production by converting substantially all of the $C_{18+}$ fraction material into lower boiling point compounds that are suitable for use in aviation fuel. The compound size adjustment may therefore include clear benefits over other systems that may not fully utilize the heavier compounds of the feedstock for aviation fuel production.

The $C_{8-18}$ fraction from the fractionator may be sent to an isomerization reactor to lower its freeze point to meet aviation fuel specifications by converting the normal alkanes into branched or iso-alkanes of the same molecular weight. Additionally, any light ends produced by cracking in the isomerization reactor may be separated from the aviation fuel product and returned to the fractionator. As such, light ends from the fractionator are not processed in the isomerization reactor. Therefore, the isomerization reactor only receives the $C_{8-18}$ fraction for isomerization. This allows for lower severity operation of the isomerization reactor and implementation of a reduced catalyst volume, compared to systems without the present unit configuration. Lower temperatures for both hydrocracking and isomerization steps limit or reduce production of light end byproducts, thus maximizing the yield of the most desirable aviation fuel product. As such, the present disclosure may separate normal alkanes into fractions suitable for their respective upgrading processes, thus efficiently modifying their molecular sizes and qualities, including boiling points, for maximized production of aviation fuel.

FIG. 1 is a schematic diagram of a refining system 100 for producing aviation fuel, according to some embodiments disclosed herein. The refining system 100, for example, may include multiple components or units that are optimally arranged to facilitate production of aviation fuel at higher efficiencies and yields than previously available systems. For example, the illustrated example of the refining system 100 includes a fractionator 120, a hydrocracking reactor 130, and an isomerization reactor 140. As will be understood, the present configuration of and interconnections in the refining system 100 provide improved management of compounds in which compounds over a threshold size are converted to sizes suitable for aviation fuel use and only compounds sized for aviation fuel are supplied to the isomerization reactor 140. As one example, positioning the fractionator 120 upstream of the hydrocracking reactor 130 and the isomerization reactor 140 facilitates these and other benefits disclosed herein.

The refining system 100 utilizes a renewable diesel feedstock 118 as a feedstock for producing aviation fuel. The renewable diesel feedstock 118 may be a hydrodeoxygenated (HDO) renewable diesel feedstock, including normal alkanes produced by hydrodeoxygenation of glycerides, such as diglycerides, triglycerides, and/or their derivatives. For example, the renewable diesel feedstock 118 is produced by hydrotreating triglycerides and/or triglyceride derivatives, such as fats, oils, greases, and/or free fatty acids. This oxygen removal mechanism generally removes undesired oxygen from feed materials as $H_2O$, thus conserving the carbon content of the renewable diesel feedstock 118. In certain examples, the production of the renewable diesel feedstock 118 includes additional oxygen removal mechanisms, such as decarboxylation that removes $CO_2$ and/or decarbonylation that removes CO. In some examples, the hydrodeoxygenation of triglycerides also causes decarboxylation and/or decarbonylation to occur. As such, references herein to hydrodeoxygenation also include any suitable decarboxylation and/or decarbonylation that occurs along with the hydrodeoxygenation. The renewable diesel feedstock 118 of certain examples is hydrotreated by hydrodeoxygenation in a respective, hydrogen-rich atmosphere to produce the renewable diesel feedstock.

The examples of hydrodeoxygenation of triglycerides implemented herein generate alkanes that, unlike free fatty acids, do not include a carboxyl functional group that entail further processing. As such, the renewable diesel feedstock 118 contains normal alkanes or straight-chain hydrocarbons ranging from $C_1$ to $C_{18+}$, In certain examples, a majority of the renewable diesel feedstock contains $C_{16}$ and $C_{18}$ normal alkanes. Use of alkanes in the fractionator 120 also provides further versatility to processing steps, such as by enabling later discussed recycle loops to seamlessly integrate with the feed to the fractionator. Additionally, the lower boiling point temperatures of alkanes compared to fatty free acids enables fractionation to proceed at lower temperatures, such that the fractionator 120 operates with lower temperatures and reduced energy usage, as compared to a comparable fractionator operating with free fatty acids.

The renewable diesel feedstock 118 is supplied to the fractionator 120, which separates the renewable diesel feedstock 118 into fractions or streams of alkanes having specific properties, such as a range of distillation temperatures or boiling points. The fractionator 120 includes a first vessel that has a first inlet, a first outlet, a second outlet, and a third outlet. In certain examples, the fractionator 120 operates in a continuous process that separates or divides the hydrocarbons therein based on pre-determined cut points established based on physical properties, such as boiling points or sizes. In particular, the fractionator 120 and/or renewable diesel feedstock 118 receive thermal energy from a heat source to generate a thermal gradient within the first vessel, which ranges from hottest temperatures near the bottom to coldest near the top of the first vessel. In some examples, the heat source includes a preheater, a heater, a fired heater, a furnace, and/or a reboiler. The hydrocarbons within the first vessel therefore vaporize at respective boiling points and rise until met with a region having a respective condensation temperature, at which a fraction having a desired composition can be removed.

In the illustrated embodiment, the fractionator 120 separates the renewable diesel feedstock 118 into three fractions: a light fraction 122 having substantially $C_{1-8}$ or $C_{8-}$ compounds, a middle fraction or aviation fuel-range fraction 124 having substantially $C_{8-18}$ compounds, and a heavy fraction 126 having substantially $C_{18+}$ compounds. These components are also referred to as a $C_{8-}$ fraction, a $C_{8-18}$ fraction, and a $C_{18+}$ fraction, in examples. The aviation fuel-range fraction 124 contains compounds with a suitable boiling point temperature for use as aviation fuel, such as sustainable aviation fuel and/or renewable jet fuel. In examples, the fractionator 120 separates the compounds within a threshold range of boiling point temperatures, associated with certain $C_{8-18}$ compounds, and outputs them through the second outlet for further processing into aviation fuel. The light fraction 122 contains compounds with boiling point temperatures that are below the threshold range and thus can be provided as naphtha, LPG, and/or fuel gas by the refining system 100. The light fraction 122 is continuously removed or sent through the first outlet of the fractionator 120, in certain examples. The heavy fraction 126, containing compounds with boiling point temperatures that are above the threshold range suitable for use as aviation fuel, can be continuously removed through the third outlet of the fractionator 120.

As recognized herein, the present refining system 100 upgrades, or adds value to, compounds of the heavy fraction 126 within the hydrocracking reactor 130 to increase a yield of aviation fuel. The hydrocracking reactor 130 includes a second vessel that has a second inlet and a fourth outlet. In examples, the second inlet of the hydrocracking reactor 130 is connected to and in fluid communication with the third outlet of the fractionator 120 to receive at least a portion of the heavy fraction 126 therefrom. In some examples, the hydrocracking reactor 130 receives an entirety of the heavy fraction 126. In certain examples, a drag stream is removed from the heavy fraction 126 upstream of the hydrocracking reactor 130, which receives a remaining portion of the heavy fraction 126. Certain drag streams removed from the heavy fraction 160 are sold or utilized as a diesel product, in some examples. Within the hydrocracking reactor 130, the heavy fraction 126 containing $C_{18+}$ compounds are subject to hydrocracking to produce a hydrocracked product 132 that contains any suitable alkanes, such as $C_{1-18+}$ compounds.

Certain $C_{18+}$ compounds of the heavy fraction 126 are cracked within the hydrocracking reactor 130 into a first portion of compounds in the $C_{8-18}$ range and a second portion of compounds in the $C_{8-}$ range.

In more detail, compounds of the heavy fraction 126 are converted into two or more respective, smaller compounds when exposed to operating conditions in the hydrocracking reactor 130. The operating conditions of the hydrocracking reactor 130 may include a high temperature and a high hydrogen pressure, provided with a zeolite hydrocracking catalyst. The hydrocracking catalyst of some examples includes a precious metal on a zeolite catalyst. In some examples, the hydrocracking catalyst is not sulfided, thus facilitating direct supply of the hydrocracked product 132 to the fractionator 120 (after any cooling and/or separations from recycle gas), without requiring use of hydrogen sulfide gas. In some examples, avoiding the use of hydrogen sulfide gas is desirable for systems including an isomerization catalyst containing precious metal because the sulfur would otherwise poison or negatively affect the precious metal of the isomerization catalyst. In some examples, the isomerization catalyst can include a base metal instead of a precious metal and thus be unaffected by hydrogen sulfide gas, such that the hydrocracking catalyst can be sulfided without negative effects.

Additionally, to facilitate the hydrocracking reactions, the hydrocracking reactor 130 can have an operating temperature in a range between about 400 and about 800° F. (between about 204.4 and about 426.7° C.). In some examples, the operating temperature is in a range between about 300 and about 700° F. (between about 148.9 and about 371.1° C.). In some examples, the operating temperature is in a range between about 500 and about 900° F. (between about 260.0 and about 482.2° C.). The partial pressure of hydrogen in the hydrocracking reactor 130 is at least 200 psi, in some examples. In some examples, the partial pressure of hydrogen is at least 300, 400, 500, 600, 700, 800, 900, 1,000, 1,200, 1,500, 2,000, 2,500, or more psi. The hydrogen supplied to the hydrocracking reactor 130 may be provided by any suitable hydrogen source. It should be understood that, in some examples, one or more $C_{18+}$ compounds may remain in the hydrocracked product 132. For example, certain compounds produced from cracking large $C_{19+}$ compounds include $C_{18+}$ compounds and/or not all $C_{18+}$ compounds of the heavy fraction 126 may be cracked in a first pass through the hydrocracking reactor 130. As such, the hydrocracked product 132 of certain examples includes a wide variety of alkanes (e.g., $C_{1-18+}$ compounds), while the heavy fraction 126 contains substantially $C_{18+}$ compounds and excludes substantially $C_{1-17}$ compounds.

Compared to certain traditional operations, the disclosed refining system 100 having the fractionator 120 upstream of both the hydrocracking reactor 130 and the isomerization reactor 140 enables operating conditions of the hydrocracking reactor 130 to be customized and/or optimized for cracking the heavy fraction 126. For example, the heavy fraction 126 supplied to the hydrocracking reactor 130 may include only $C_{18+}$ normal alkanes. The normal alkanes diffuse into and out of pores of the zeolite hydrocracking catalyst more easily or efficiently than branched compounds, enabling lower cracking temperatures to be used for compound size reduction in the hydrocracking reactor 130. In examples, the lower temperature limits or reduces production of light end byproducts, thus increasing or maximizing the yield of the more desirable aviation fuel product. The aviation fuel yield is further improved because the refining system 100 does not direct compounds already within the desired $C_{8-18}$ range to hydrocracking. In other words, overcracking that otherwise produces undesired light ends is reduced or avoided. The refining system 100 also reduces or minimizes a reactor size and corresponding capital expenses implemented for hydrocracking, because only the specific $C_{18+}$ compounds to be reduced are supplied to the hydrocracking reactor 130. Compared to higher temperature reactions, the lower temperatures utilized by the refining system 100 decrease the rate of undesired thermal cracking reactions that would otherwise lower yield of desired products and increase the rate of coke formation on the catalyst. Reduced coke formation is desired based on coke production reducing desired product yield via use of carbon content for forming coke, not aviation fuel, and deactivating the catalyst more rapidly, thus requiring more frequent catalyst changes and consequently more process down time.

The fourth outlet of the hydrocracking reactor 130 is connected to recycle at least a portion of the hydrocracked product 132 to the fractionator 120 or its feed. For example, the fourth outlet is connected to and in fluid communication with the first inlet of the fractionator 120. The hydrocracked product 132 is therefore mixed with the renewable diesel feedstock 118 that is fed to the fractionator 120. In other examples, the fourth outlet may be connected to another inlet of the fractionator 120, as discussed with reference to FIG. 3 below. The fractionator 120 receives an entirety of the hydrocracked product 132 or a portion thereof, in certain examples. The hydrocracked product 132 of some examples is cooled and separated from recycle gas of the hydrocracking reactor 130 before entering the fractionator 120. In any case, the refining system 100 includes recycling the hydrocracked product 132 to the fractionator 120. As such, all compounds that have boiling points that are above boiling points for aviation fuel are recycled to extinction, thereby converting all input material of the refining system 100 into aviation fuel or lighter products. Additionally, the fractionator 120 includes dual functions of separating the initial renewable diesel feedstock 118 into fractions, as well as separating the hydrocracked product 132 into the fractions.

From the fractionator 120, the aviation fuel-range fraction 124 of $C_{8-18}$ compounds is supplied to the isomerization reactor 140 to be further processed or refined into an aviation fuel product 142. In some examples, the aviation fuel product 142 is an SPK product that is blended with an aromatic-containing fuel, such as an aromatic sustainable fuel and/or a petroleum fuel, to form an SAF having various standardized properties. The aromatic sustainable fuel of certain examples is obtained from processing of a sustainable source (e.g., sugars) and/or from an aromatic chemical production facility. As an example, a predominantly paraffinic SPK product may be blended with the aromatic-containing fuel to produce SAF containing a minimum content of aromatic compounds, as specified by one or more ASTM standards. As another example, to meet certain ASTM standards for aviation turbine fuel (D1655 and D7566), an aviation fuel may constitute up to 50% of the SPK product that is blended with a petroleum-derived jet fuel to produce the aviation fuel with final physical and chemical properties that correspond to standardized aviation use. In certain examples, the aviation fuel product 142 is used directly as an SAF without blending with an aromatic-containing fuel. The isomerization reactor 140 includes a third vessel that has a third inlet and a fifth outlet. In examples, the third inlet of the isomerization reactor 140 is connected to and in fluid communication with the second outlet of the fractionator 120 to receive at least a portion of the aviation fuel-range fraction 124. The isomerization reactor 140 receives an entirety of the aviation fuel-range fraction 124 or a portion thereof, in certain examples. The aviation fuel-range fraction 124 of certain examples also includes $C_{8-18}$ compounds of the hydrocracked product 132 provided to the fractionator 120 from the hydrocracking reactor 130, which enhances product yield.

The isomerization reactor 140 isomerizes the $C_{8-18}$ compounds of the aviation fuel-range fraction 124 into the aviation fuel product 142, which is output to the fifth outlet of the isomerization reactor 140. For example, operating conditions in the isomerization reactor 140 are selected to lower a freeze point of the aviation fuel-range fraction 124 to meet aviation fuel specifications by converting normal alkanes into branched or iso-alkanes of the same molecular weight. The isomerization reactor 140 isomerizes compounds with an isomerization catalyst in the presence of hydrogen, which is provided by any suitable hydrogen source. For example, the partial pressure of hydrogen in the isomerization reactor 140 is at least 200 psi, in some examples. In some examples, the partial pressure of hydrogen is at least 300, 400, 500, or more psi. The isomerization reactor 140 and the hydrocracking reactor 130 may receive hydrogen from separate hydrogen sources or from a shared hydrogen source, in examples. In some examples, the isomerization reactor 140 includes an operating temperature in a range between about 400 and about 800° F. (between about 204.4 and about 426.7° C.). In some examples, the operating temperature is in a range between about 300 and about 700° F. (between about 148.9 and about 371.1° C.). In some examples, the operating temperature is in a range between about 500 and about 900° F. (between about 260.0 and about 482.2° C.).

The particular configuration of the refining system 100 further enhances the operation of the isomerization reactor 140. For example, because only $C_{8-18}$ compounds are isomerized, lower severity operation and a smaller catalyst volume are be used in the isomerization reactor 140, compared to systems that may also isomerize light ends or $C_{8-}$ compounds. The refining system 100 may also exclude or avoid a stabilizer for adjusting an initial boiling point of the aviation fuel product 142, based on the specific separation of the aviation fuel-range fraction 124 from other components in the fractionator 120. The reduced demand for a stabilizer further enables the isomerization reactor 140 to be constructed with a smaller size and corresponding reduced capital cost. Removal of the $C_{8-}$ compounds prior to processing also facilitates maintenance of a higher hydrogen partial pressure within the isomerization, thus providing both reduced deactivation of an isomerization catalyst and improved isomerization selectivity for the aviation fuel product 142.

Figure 2:
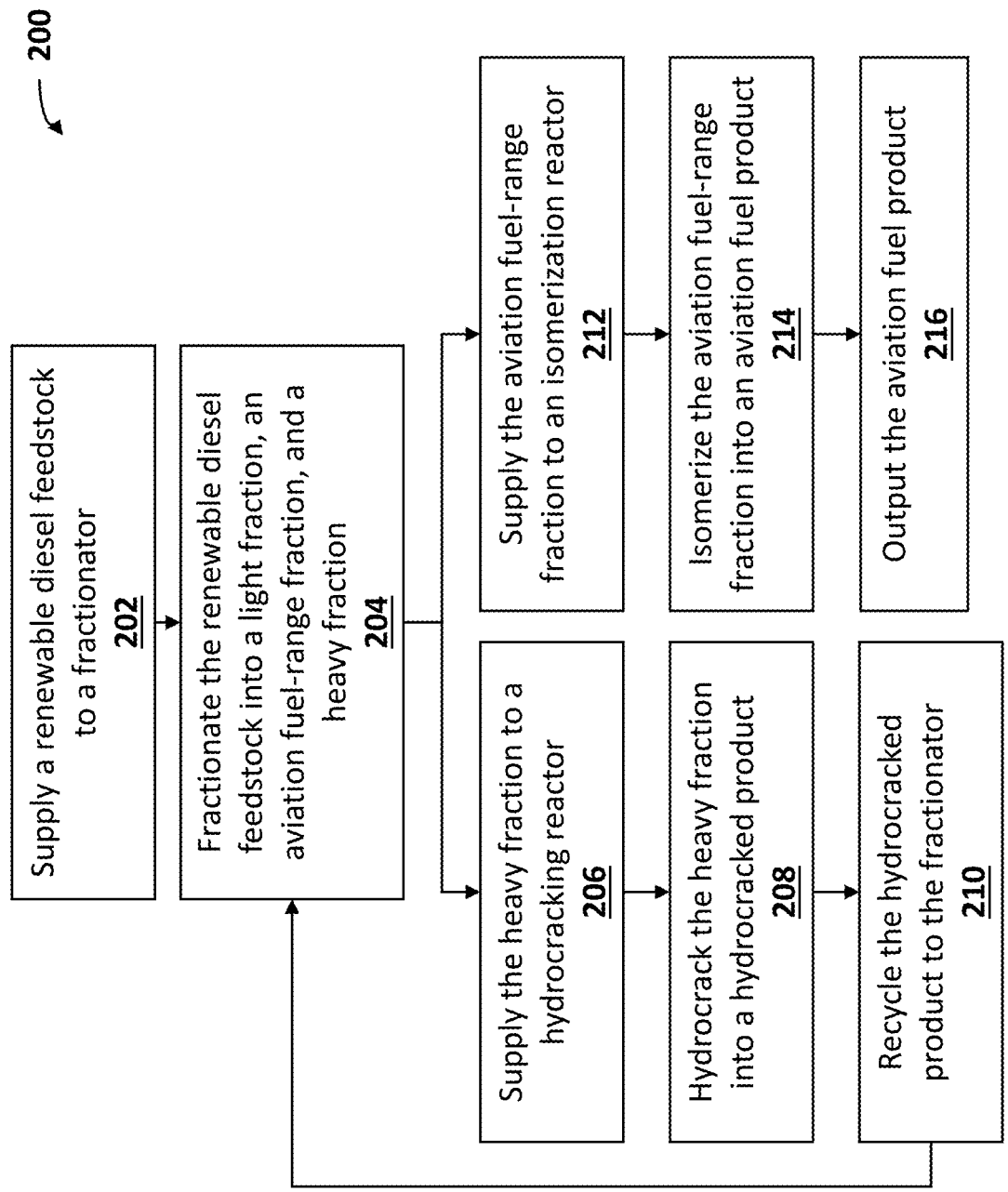
FIG. 2 is an illustration of a method for producing aviation fuel, such as with the refining system of FIG. 1, according to embodiments of the disclosure.

FIG. 2 is an illustration of a method 200 for producing aviation fuel, according to some embodiments disclosed herein. The method 200 is described with reference to the refining system 100 of FIG. 1. Additionally, the steps or actions of the method 200 may be completed, implemented, or controlled by a suitable control component, such as a controller 502 discussed with reference to FIG. 5. For example, the method 200 may be included in one or more programs, protocols, or instructions loaded into a memory 506 of the controller 502 and executed on one or more processors 504 of the controller 502.

At block 202 of the method 200, the refining system 100 (or a controller thereof) supplies a renewable diesel feedstock 118 to a fractionator 120. The renewable diesel feedstock 118 is a HDO or hydrodeoxygenated renewable diesel feedstock that contains normal alkanes produced from triglycerides, in certain examples. At block 204, the refining system 100 fractionates the renewable diesel feedstock into a light fraction 122, an aviation fuel-range fraction 124, and a heavy fraction 126. As noted above, the fractionator 120 may include a first inlet to receive the renewable diesel feedstock, a first outlet to output the light fraction 122, a second outlet to output the aviation fuel-range fraction 124, and a third outlet to output the heavy fraction 126.

At block 206, the refining system 100 supplies the heavy fraction 126 to a hydrocracking reactor 130. Thus, at block 208, the refining system 100 hydrocracks the heavy fraction 126 into a hydrocracked product 132. At block 210, the refining system 100 recycles the hydrocracked product 132 to the fractionator 120. The hydrocracking reactor 130 may include a second inlet to receive the heavy fraction 126 and a fourth outlet to supply the hydrocracked product 132 to the fractionator 120. As such, a recycle loop is provided to circulate the heavy fraction 126 through the hydrocracking reactor 130 and the fractionator 120 to produce smaller compounds that further increase the yield of aviation fuel.

Moreover, at block 212, the refining system 100 supplies the aviation fuel-range fraction 124 to an isomerization reactor 140. In certain examples, block 206 and block 212 are performed in parallel, such as during operations in which the refining system is operated in a continuous processing mode. At block 214, the refining system 100 isomerizes the aviation fuel-range fraction 124 into an aviation fuel product 142. For example, the isomerization reactor 140 may include a third inlet to receive the aviation fuel-range fraction 124 and a fifth outlet to output the aviation fuel product 142. As such, at block 216, the refining system 100 outputs the aviation fuel product 142 from the fifth outlet to be further utilized in or transported from the refining system 100.

Figure 3:
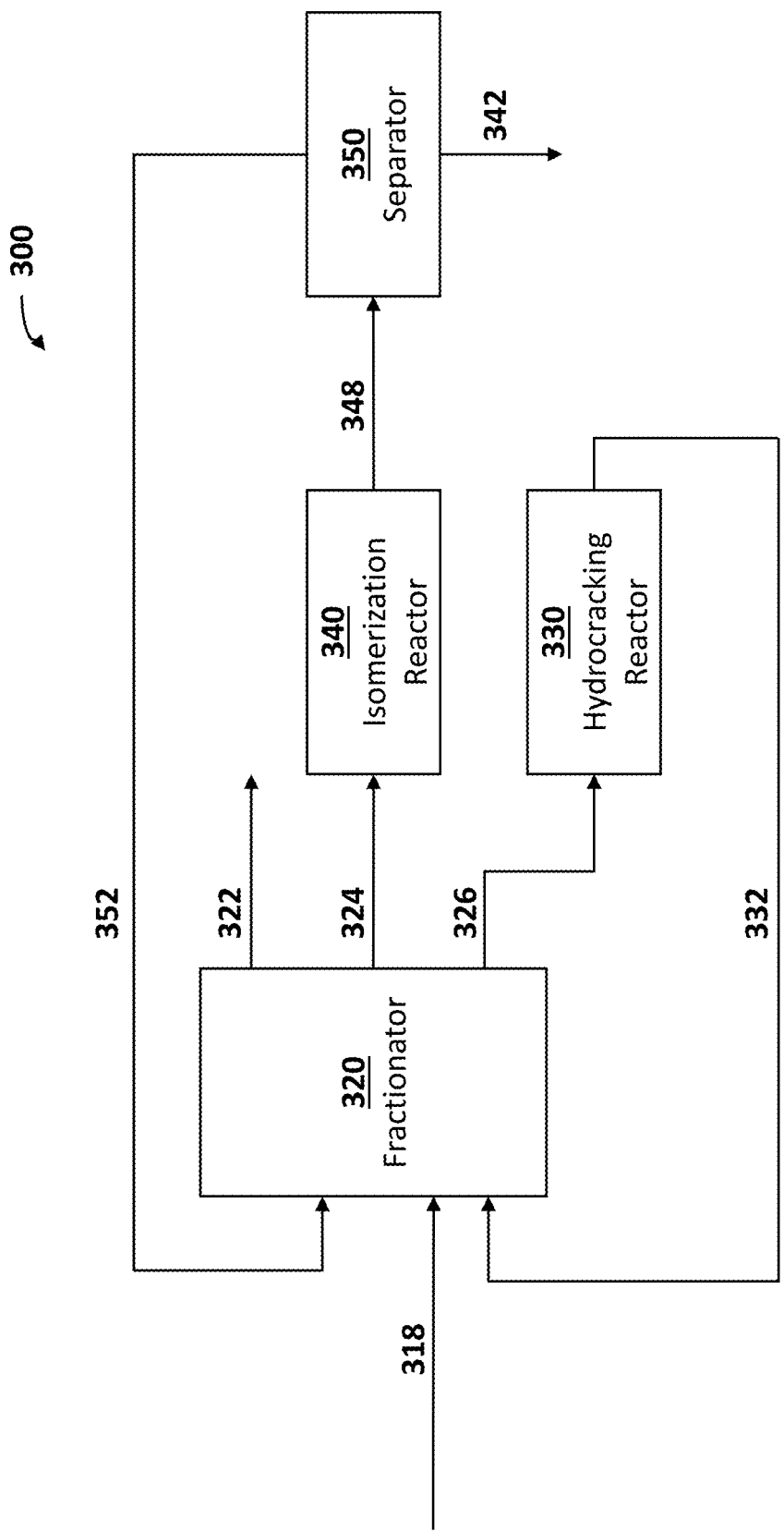
FIG. 3 is a schematic diagram of another refining system for producing aviation fuel according to embodiments of the disclosure.

FIG. 3 is a schematic diagram of another refining system 300 for producing aviation fuel, according to some embodiments disclosed herein. As illustrated, the refining system 300, for example, includes two recycle loops that cooperate to improve the yield, efficiency, and/or properties of aviation fuel produced by the refining system 300. The refining system 300 of FIG. 3 includes certain components or units that are similar to those discussed above with reference to FIG. 1. These components or units are similarly labeled, and their descriptions are not repeated in detail for improved clarity. For example, the refining system 300 includes a fractionator 320, a hydrocracking reactor 330, and an isomerization reactor 340.

As discussed above, the fractionator 320 may include a first vessel that has a first inlet, a first outlet, a second outlet, and a third outlet. The fractionator 320 separates the renewable diesel feedstock 318 into three fractions: a light fraction 322 having substantially $C_{1-8}$ or $C_{8-}$ compounds, an aviation fuel-range fraction 324 having substantially $C_{8-18}$ compounds, and a heavy fraction 326 having substantially $C_{18+}$ compounds. The hydrocracking reactor 330 may include a second vessel that has a second inlet to receive at least a portion of the heavy fraction 326 and a fourth outlet. Additionally, the isomerization reactor 340 may include a third vessel that has a third inlet to receive at least a portion of the aviation fuel-range fraction 324 and a fifth outlet. To illustrate another non-limiting example, the refining system 300 of FIG. 3 includes a fourth inlet into the fractionator 320 connected to and in fluid communication with the fourth outlet of the hydrocracking reactor 330 to receive at least a portion of a hydrocracked product 332 therefrom. The fourth inlet may be independent of the first inlet associated with the renewable diesel feedstock 318, thus providing an additional control variable for managing operation of the fractionator 320. In some examples, the fourth inlet is provided at a different tray or height of the fractionator 320, compared to the first inlet.

As an additional feature, the refining system 300 includes a separator 350 positioned downstream of the isomerization reactor 340 to further refine the aviation fuel produced by the refining system 300. For example, certain operations or examples of the isomerization reactor 340 generate additional $C_{8-}$ light ends or compounds via cracking during isomerization of the aviation fuel-range fraction 324 having $C_{8-18}$ compounds. The fifth outlet of the isomerization reactor 340 therefore outputs a mixed product 348 having $C_{17-}$ compounds. The separator 350 includes a fourth vessel having a fifth inlet, a sixth outlet, and a seventh outlet. The fifth inlet is connected to and in fluid communication with the fifth outlet of the isomerization reactor 340 to supply at least a portion of the mixed product 348 to the fourth vessel. In certain examples, the separator 350 is a flash drum or flash that performs separations based on flash evaporation of the mixed product 348. In some examples, the separator 350 includes a stripper, as well as an additional inlet that receives a suitable stripping gas for facilitating the desired separation therein.

Embodiments of the separator 350 include suitable operating conditions to separate or strip a produced light fraction 352 of $C_{8-}$ compounds, or additional $C_{8-}$ fraction, from the aviation fuel product of $C_{8-18}$ compounds. Accordingly, the sixth outlet at a top of the separator 350 is connected to recycle at least a portion of the produced light fraction 352 back to the fractionator 320, from which the produced light fraction 352 are directed through the first outlet of the fractionator 320 as the light fraction 322. Certain examples of the fractionator 320 include a sixth inlet that is connected to and in fluid communication with the sixth outlet of the separator 350. In other examples, the produced light fraction 352 may be mixed with the renewable diesel feedstock 318. Additionally, the seventh outlet at a bottom of the separator 350 outputs the relatively heavier aviation fuel product 342, which includes $C_{8-18}$ compounds within targeted aviation fuel specifications.

Figure 4:
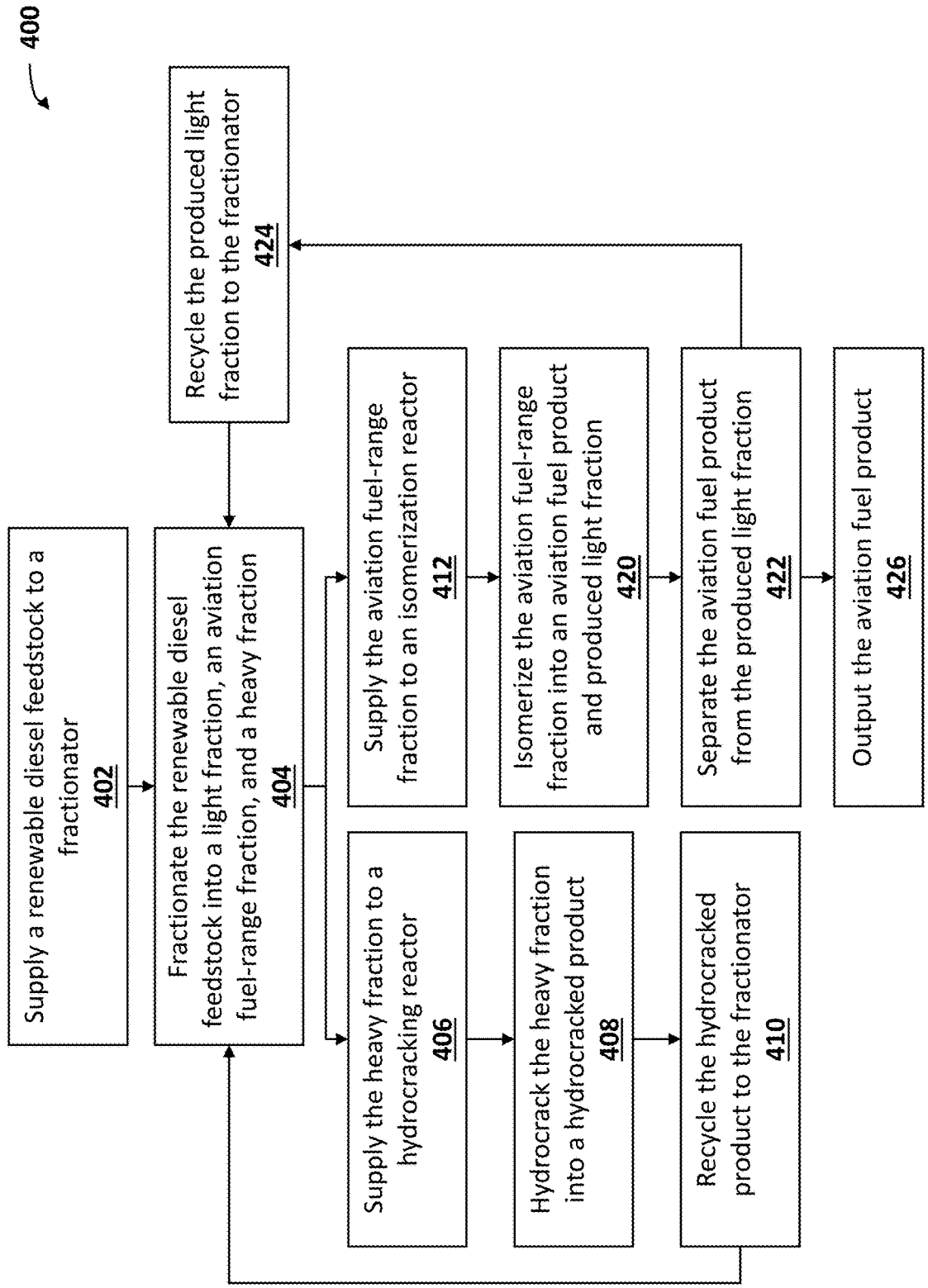
FIG. 4 is an illustration of a method for producing aviation fuel, such as with the refining system of FIG. 3, according to embodiments of the disclosure.

FIG. 4 is an illustration of a method 400 for producing aviation fuel, according to some embodiments disclosed herein. The method 400, for example, is described with reference to the refining system 300 of FIG. 3. Additionally, the steps or actions of the method 400 may be completed, implemented, or controlled by a suitable control component, such as a controller 502 discussed with reference to FIG. 5. For example, the method 400 may be included in one or more programs, protocols, or instructions loaded into a memory 506 of the controller 502 and executed on one or more processors 504 of the controller 502.

The method 400 includes certain blocks or actions that are similar to those of method 200 discussed above with reference to FIG. 2. These blocks, including blocks 402, 404, 406, 408, 410, and 412, and their descriptions are not repeated here for improved clarity. Looking to block 420, the refining system 300 isomerizes the aviation fuel-range fraction 324 into an aviation fuel product 342 and a produced light fraction 352. For example, as discussed above, certain operations of the isomerization reactor 340 cause production of additional $C_{8-}$ compounds. At block 422, the refining system 300 separates the aviation fuel product 342 from the produced light fraction 352. Certain examples include performing the separation by stripping the produced light fraction 352 from the aviation fuel product 342 within a separator 350.

At block 424, the refining system 300 recycles the produced light fraction 352 to the fractionator 320. As such, a second recycle loop is provided within the refining system to enable further refinement of the aviation fuel product 342 at desirably increased yields. At block 426, the refining system 300 outputs the aviation fuel product 342 to be used in and/or transported from the refining system 300.

Figure 5:
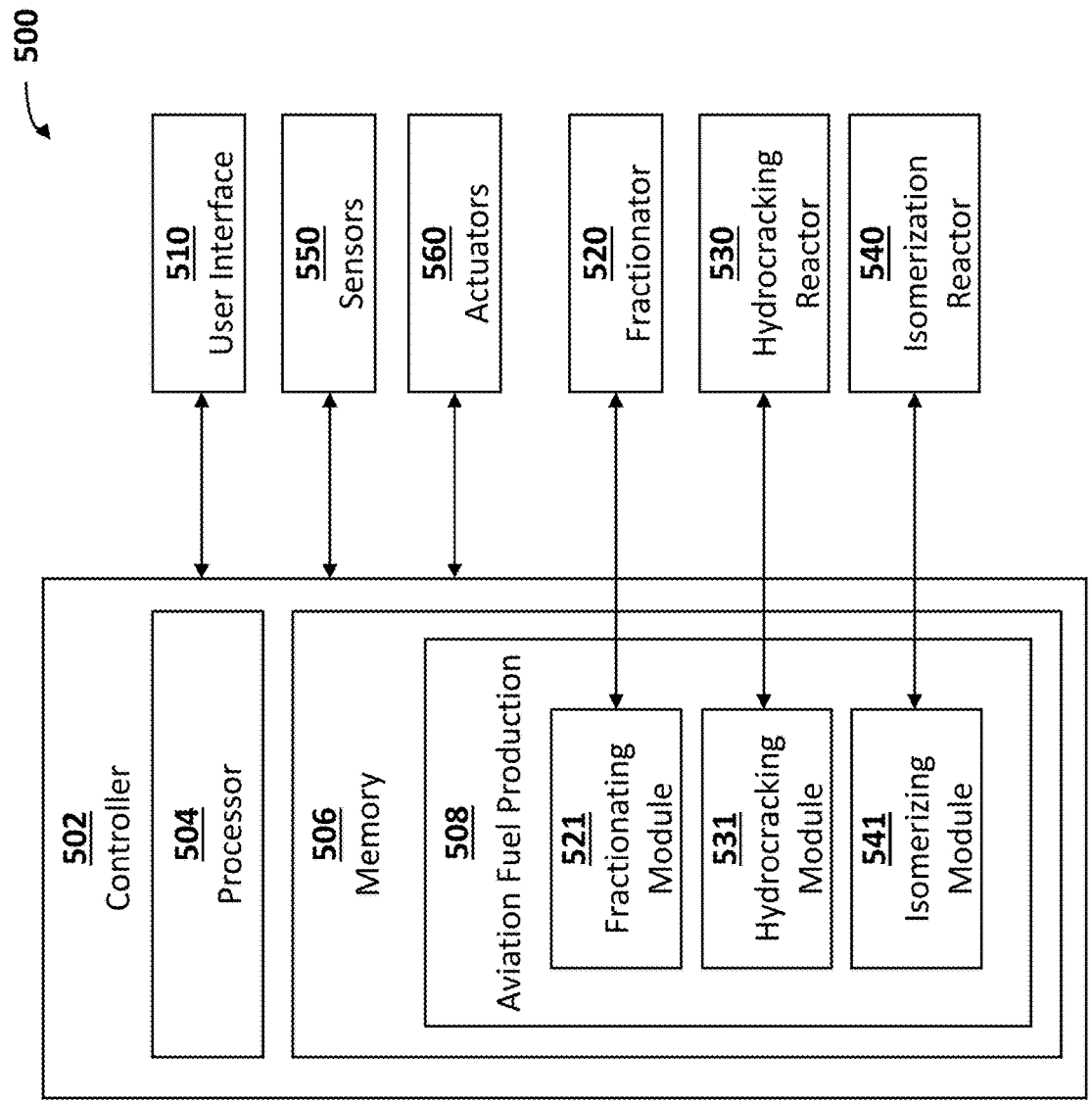
FIG. 5 is a schematic diagram of a controller of a refining system according to embodiments of the disclosure.

FIG. 5 is a simplified diagram illustrating a control system 500 for managing the producing of aviation fuel according to some embodiments disclosed herein. In some examples, the control system 500 includes a controller 502 or one or more controllers. Certain examples include the controller 502 being in signal communication with various other controllers throughout or external to a refining system, such as one of the refining systems 100, 300 discussed above. Additionally, the controller 502 may be considered a supervisory controller or other suitable control component for managing the refining system, as discussed herein.

The controller 502 of various examples disclosed herein include one or more processors, such as processor 504, as well as a memory or machine-readable storage medium, such as memory 506. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive, a hard drive, a solid state drive, any type of storage disc, and the like, or a combination thereof. The memory 506 stores or includes instructions executable by the processor 504. As used herein, a "processor" includes, for example, one processor or multiple processors included in a single device or distributed across multiple computing devices. The processor 304 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another. In the drawings and specification, several examples of systems and methods of producing aviation fuel are disclosed. The controller 502 includes instructions 508 to produce the aviation fuel according to the examples disclosed herein.

In some examples, the instructions 508 cause the refining system to produce the aviation fuel product. For example, the controller 502 may receive any suitable product specifications and/or operating conditions from a user interface 510 and/or from data pre-loaded into the memory 506. To produce the aviation fuel product to the desired or target specifications, the controller 502 sends signals to and/or receives signals from a fractionator 520, a hydrocracking reactor 530, an isomerization reactor 540, and/or any other units associated with the refining system. The signals transmitted by the controller 502 may include operating parameters for each unit, such as temperatures, length of operating time, amount of incoming feedstock, amount of product to be produced, as well as other parameters. As an example, the controller 502 selects an operating temperature for the hydrocracking reactor 530, which is lower than a reference operating temperature of a reference hydrocracking reactor that is downstream instead of upstream of an associated reference isomerization reactor. Additionally, the controller 502 selects an operating temperature for the isomerization reactor 540 that is lower than a reference operating temperature of a reference isomerization reactor that is upstream instead of downstream of an associated reference hydrocracking reactor. The instructions 508 and/or any other suitable portion of the controller 502 may include any suitable software applications, routines, or programming to produce the aviation fuel product. For examples, the instructions 508 can include a fractionating module 521 for controlling operation of the fractionator 520, a hydrocracking module 531 for controlling operation of the hydrocracking reactor 530, and an isomerizing module 541 for controlling operation of the isomerization reactor 540.

The control system 500 of some examples may also include various sensors and meters disposed through the refining system, such as the illustrated sensors 550 communicatively coupled to the controller 502. The sensors and meters may be in signal communication with the controller 502 and may provide data or feedback to the controller 502 to determine various properties of each unit and/or product at various stages in the process. The sensors and meters may measure flow, density, chemical properties, temperature, pressure, and/or other properties, utilized for monitoring the production of the aviation fuel product. Based on data received from the sensors 550, the controller 502 can monitor the process from initiation through completion to produce the aviation fuel product. In some examples, the control system 500 also includes various actuators 560 in signal communication with the controller 502 to facilitate adjustment and/or control of the various operating parameters, properties, and so forth. The actuators 560 can include any suitable pneumatic, electric, mechanical, and/or hydraulic control components, including control valves, pumps, compressors, heating elements, electrical switches, and so forth. The controller 502 can instruct one or more actuators 560 on demand and/or at a predetermined or selected schedule to adjust flows, densities, chemical properties, temperatures, pressures, and/or other properties utilized during production of the aviation fuel product.

Figure 6:
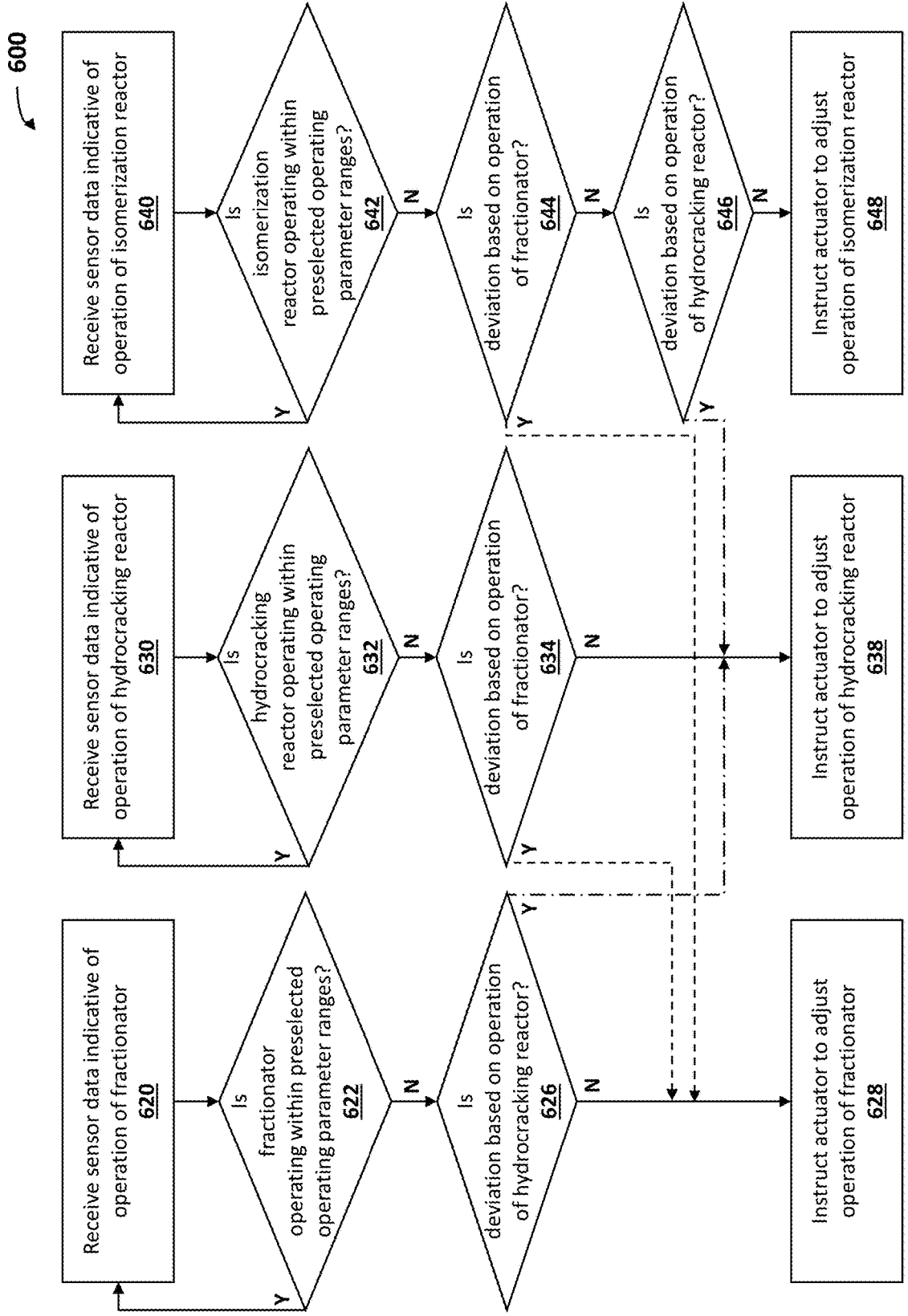
FIG. 6 is an illustration of a method for producing aviation fuel as performed by a controller according to embodiments of the disclosure.

FIG. 6 is an illustration of a method 600 for controlling production of aviation fuel, according to some embodiments disclosed herein. The method 600, for example, is described with reference to the control system 500 of FIG. 5. The order in which the operations are described is not intended to be construed as a limitation, and any number of the described blocks may be combined in any order and/or in parallel to implement the method. Additionally, the steps or actions of the method 600 may be completed, implemented, or controlled by the controller 502 discussed above. The method 600 may be included in one or more modules, programs, protocols, or instructions of the controller 502. For example, certain steps can be performed by one or more of the fractionating modules 521, the hydrocracking module 531, and the isomerizing module 541, respectively. As a non-limiting example, the fractionating module 521 may perform the steps of the left-hand column of the method 600, the hydrocracking module 531 may perform the steps of the center column of the method 600, and the isomerizing module 541 may perform the steps of the right-hand column of the method 600. In certain examples, each column of the method 600 is performed in parallel, such as via the various modules of the controller 502, which can communicate with one another as described below.

As recognized herein, the fractionator 520, the hydrocracking reactor 530, and the isomerization reactor 540 work cooperatively to produce aviation fuel in a system arranged as discussed above, in which operation of an upstream component can influence operation of any downstream component. The present example of the method 600 illustrates certain control steps that can improve the interoperation of equipment arranged according to the present disclosure, such as by allowing specialization of control components and/or more rapid detection and/or prevention of any undesired operations or products by the fractionator 520, the hydrocracking reactor 530, and the isomerization reactor 540.

Looking first to the left-hand column, at block 620 of the method 600, the controller 502 receives sensor data indicative of operation of the fractionator 520. For example, the controller 502 may receive one or more signals indicative of flow, density, chemical properties, temperature, pressure, and/or other properties associated with operation of the fractionator 520. At block 622, the controller 502 determines whether the fractionator 520 is operating within one or more preselected operating parameter ranges. In some examples, the operating parameter ranges may be preselected and/or updated on demand in response to instructions received from a user interface or device, from another controller, and/or from another module of the control system. The controller 502 can evaluate each received operating parameter individually or collectively to identify any operating parameters that are currently deviating, or predicted to deviate in the near future, from their corresponding ranges. In response to determining that the fractionator 520 is operating within the preselected operating parameter ranges or that no deviations are present, the controller 502 returns to block 620 to continue monitoring the sensor data associated with the fractionator 520.

In response to determining that, at block 622, the fractionator 520 includes one or more operating parameters that are not within their associated preselected ranges, the controller 502 proceeds to block 626 to determine whether a deviation is based on operation of the hydrocracking reactor 530. That is, the fractionator 520 receives the renewable diesel feedstock and a recycle stream of hydrocracked product from the hydrocracking reactor 530. Based on the sensor data, the controller 502 can determine whether the deviation in the fractionator 520 originates with or is based at least in part on the hydrocracked product from the hydrocracking reactor 530. In response to determining that, at block 626, the deviation is not based on operation of the hydrocracking reactor 530, the controller 502 continues to block 628 to instruct one or more actuators to adjust operation of the fractionator 520. The controller 502 can thus correct the fractionator 520 to reduce or eliminate the deviation, before continued monitoring of the fractionator 520 at block 620.

In response to determining that, at block 626, the deviation is based on operation of the hydrocracking reactor 530, the controller 502 proceeds to block 638 to instruct one or more actuators to adjust operation of the hydrocracking reactor 530. In some examples in which the fractionating module 521 performs steps of the left-hand column of the method 600, the fractionating module 521 provides one or more signals to the hydrocracking module 531 (as illustrated by a dash-dotted line) to enable the hydrocracking module 531 to perform the adjustments to the hydrocracking reactor 530.

Turning to the center column of the method 600, at block 630, the controller 502 receives sensor data indicative of operation of the hydrocracking reactor 530. As discussed in detail above, the hydrocracking reactor 530 is in a recycle loop with the fractionator 520, which can each affect one another during operation. Additionally, the hydrocracking reactor 530 and the fractionator 520 are both upstream of the isomerization reactor 540, which does not affect operation of the hydrocracking reactor 530 and the fractionator 520. At block 632, the controller 502 determines whether the hydrocracking reactor 530 is operating within one or more preselected operating parameter ranges. As noted above, the controller 502 can monitor any suitable operating parameter associated with operation of the hydrocracking reactor 530, and the operating parameter ranges may be preselected and/or updated on demand in response to instructions received from any suitable device or module. In response to determining that the hydrocracking reactor 530 is operating within the preselected operating parameter ranges or that no deviations are present, the controller 502 returns to block 630 to continue monitoring the sensor data associated with the hydrocracking reactor 530.

In response to determining that the hydrocracking reactor 530 includes one or more operating parameters that are not within their associated preselected ranges, the controller 502 proceeds to block 634 to determine whether a deviation is based on operation of the fractionator 520. In response to determining that, at block 634, the deviation is based on operation of the fractionator 520, the controller 502 proceeds to block 628 to instruct one or more actuators to adjust operation of the fractionator 520. In some examples in which the hydrocracking module 531 performs steps of the center column of the method 600, the hydrocracking module 531 provides one or more signals to the fractionating module 521 (as illustrated by a dashed line) to enable the fractionating module 521 to perform the adjustments to the fractionator 520.

In response to determining that, at block 634, the deviation is not based on operation of the fractionator 520, the controller 502 continues to block 638 to instruct one or more actuators to adjust operation of the hydrocracking reactor 530. The controller 502 can thus correct the hydrocracking reactor 530 to reduce or eliminate the deviation, before continued monitoring of the hydrocracking reactor 530 at block 630.

With focus on the right-hand column of the method 600, at block 640, the controller 502 receives sensor data indicative of operation of the isomerization reactor 540. As discussed in detail above, the isomerization reactor 540 is downstream of both the fractionator 520 and the hydrocracking reactor 530, which each affect operation of the isomerization reactor 540. At block 642, the controller 502 determines whether the isomerization reactor 540 is operating within one or more preselected operating parameter ranges. As noted above, the controller 502 can monitor any suitable operating parameter associated with operation of the isomerization reactor 540, and the operating parameter ranges may be preselected and/or updated on demand in response to instructions received from any suitable device or module. In response to determining that the isomerization reactor 540 is operating within the preselected operating parameter ranges or that no deviations are present, the controller 502 returns to block 640 to continue monitoring the sensor data associated with the isomerization reactor 540.

In response to determining that the isomerization reactor 540 includes one or more operating parameters that are not within their associated preselected ranges, the controller 502 proceeds to block 644 to determine whether a deviation is based on operation of the fractionator 520. In response to determining that the deviation is based on operation of the fractionator 520, the controller 502 proceeds to block 628 to instruct one or more actuators to adjust operation of the fractionator 520. In some examples in which the isomerizing module 541 performs steps of the right-hand column of the method 600, the isomerizing module 541 provides one or more signals to the fractionating module 521 (as illustrated by a dashed line) to enable the fractionating module 521 to perform the adjustments to the fractionator 520.

In response to determining that, at block 644, the deviation is not based on operation of the fractionator 520, the controller 502 continues to block 646 to determine whether the deviation is based on operation of the hydrocracking reactor 530. In response to determining that the deviation is based on operation of the hydrocracking reactor 530, the controller 502 proceeds to block 638 to instruct one or more actuators to adjust operation of the hydrocracking reactor 530. For examples in which the isomerizing module 541 performs steps of the right-hand column of the method 600, the isomerizing module 541 provides one or more signals to the hydrocracking module 531 (as illustrated by a dash-dotted line) to enable the hydrocracking module 531 to perform the adjustments to the hydrocracking reactor 530.

In response to determining that, at block 646, the deviation is not based on operation of the fractionator 520 or the hydrocracking reactor 530, the controller 502 continues to block 648 to instruct one or more actuators to adjust operation of the isomerization reactor 540. The controller 502 can thus correct the isomerization reactor 540 to reduce or eliminate the deviation, before continued monitoring of the isomerization reactor 540 at block 640. Accordingly, the controller 502 performing the method 600 enables each of the fractionator 520, the hydrocracking reactor 530, and the isomerization reactor 540 to operate in an improved and cohesive manner, leveraging their arrangement to facilitate production of aviation fuel at higher efficiencies and yields than previously available systems.

This application claims priority to, and the benefit of U.S. Provisional Application No. 63/548,081, filed Nov. 10, 2023, titled "SYSTEMS AND METHODS FOR PRODUCING AVIATION FUEL," the disclosure of which is incorporated herein by reference in its entirety.

Although specific terms are employed herein, the terms are used in a descriptive sense only and not for purposes of limitation. Embodiments of systems, methods, and controllers have been described in considerable detail with specific reference to the illustrated examples. However, it will be apparent that various modifications and changes can be made within the spirit and scope of the embodiments of systems, methods, and controllers as described in the foregoing specification, and such modifications and changes are to be considered equivalents and part of this disclosure.

What is claimed is:

1. A method to produce aviation fuel, the method comprising:
   fractionating a renewable diesel feedstock in a fractionator to produce a $C_{8-}$ fraction, a $C_{8-18}$ fraction, and a $C_{18+}$ fraction;
   providing the $C_{8-18}$ fraction to an isomerization reactor to produce an aviation fuel product;
   supplying at least a portion of the $C_{18+}$ fraction to a hydrocracking reactor to produce a hydrocracked product; and
   recycling at least a portion of the hydrocracked product to the fractionator for fractionating along with the renewable diesel feedstock.

2. The method of claim 1, wherein the renewable diesel feedstock comprises a hydrodeoxygenated renewable diesel.

3. The method of claim 1, wherein the renewable diesel feedstock contains normal alkanes produced by hydrodeoxygenation of glycerides.

4. The method of claim 1, further comprising hydrotreating a renewable feedstock containing triglycerides, triglyceride derivatives, or a combination thereof in a hydrogen-rich atmosphere to produce the renewable diesel feedstock.

5. The method of claim 1, further comprising:
   mixing the hydrocracked product with the renewable diesel feedstock directly upstream of the fractionator.

6. The method of claim 1, wherein the renewable diesel feedstock is supplied to a first inlet of the fractionator, and wherein the at least a portion of the hydrocracked product is supplied to a second inlet of the fractionator.

7. The method of claim 1, wherein the recycling at least a portion of the hydrocracked product to the fractionator further comprises recycling an entirety of the hydrocracked product.

8. A method to produce aviation fuel, the method comprising:
   fractionating a renewable diesel feedstock in a fractionator to produce a $C_{8-}$ fraction, a $C_{8-18}$ fraction, and a $C_{18+}$ fraction;
   providing the $C_{8-18}$ fraction to an isomerization reactor to produce an aviation fuel product;
   supplying at least a portion of the $C_{18+}$ fraction to a hydrocracking reactor to produce a hydrocracked product;
   recycling at least a portion of the hydrocracked product to the fractionator for fractionating along with the renewable diesel feedstock;
   producing an additional $C_{8-}$ fraction in the isomerization reactor;
   providing the aviation fuel product and the additional $C_{8-}$ fraction to a separator to separate the aviation fuel product from the additional $C_{8-}$ fraction; and
   providing the additional $C_{8-}$ fraction to the fractionator.

9. The method of claim 1, further comprising:
   selecting an operating temperature of the hydrocracking reactor, the operating temperature being lower than a reference operating temperature of a reference hydrocracking reactor downstream of a reference isomerization reactor.

10. A method to produce aviation fuel, the method comprising:
    supplying a hydrodeoxygenated renewable diesel feedstock to a fractionator;
    fractionating the hydrodeoxygenated renewable diesel feedstock into a $C_{8-}$ fraction, a $C_{8-18}$ fraction, and a $C_{18+}$ fraction;
    providing the $C_{8-18}$ fraction to an isomerization reactor to produce an aviation fuel product;
    supplying at least a portion of the $C_{18+}$ fraction to a hydrocracking reactor to produce a hydrocracked product, the hydrocracking reactor cracking one or more heavy compounds of the $C_{18+}$ fraction into two or more lighter compounds; and
    recycling at least a portion of the hydrocracked product to the fractionator for fractionating along with the hydrodeoxygenated renewable diesel feedstock.

11. The method of claim 10, further comprising:
hydrodeoxygenating a triglyceride feedstock to produce the hydrodeoxygenated renewable diesel feedstock.

12. The method of claim 10, further comprising:
producing an additional $C_{8-}$ fraction in the isomerization reactor;
providing the aviation fuel product and the additional $C_{8-}$ fraction to a separator to separate the aviation fuel product from the additional $C_{8-}$ fraction; and
providing the additional $C_{8-}$ fraction to the fractionator.

13. A system to produce aviation fuel, the system comprising:
a fractionator having a first inlet to receive a renewable diesel feedstock, a first outlet, a second outlet, and a third outlet, the fractionator operable to fractionate the renewable diesel feedstock into a $C_{8-}$ fraction output through the first outlet, a $C_{8-18}$ fraction output to the second outlet, and a $C_{18+}$ fraction output to the third outlet;
a hydrocracking reactor having a second inlet and a fourth outlet, the second inlet connected to and in fluid communication with the third outlet to receive the $C_{18+}$ fraction, the hydrocracking reactor operable to hydrocrack the $C_{18+}$ fraction into a hydrocracked product, and the fourth outlet connected to recycle the hydrocracked product to the fractionator; and
an isomerization reactor having a third inlet and a fifth outlet, the third inlet connected to and in fluid communication with the second outlet to receive the $C_{8-18}$ fraction, and the isomerization reactor operable to isomerize the $C_{8-18}$ fraction into an aviation fuel product output to the fifth outlet.

14. The system of claim 13, wherein the renewable diesel feedstock contains normal alkanes produced by hydrodeoxygenation of glycerides, free fatty acids, or combinations thereof.

15. The system of claim 13, wherein a majority of the hydrodeoxygenated renewable diesel contains $C_{16}$ and $C_{18}$ normal alkanes.

16. The system of claim 13, further comprising a separator having a fifth inlet connected to and in fluid communication with the fifth outlet, a sixth outlet to supply an additional $C_{8-}$ fraction to the fractionator, and a seventh outlet to output the aviation fuel product.

17. The system of claim 13, wherein the fourth outlet is connected to and in fluid communication with the first inlet or an additional inlet of the fractionator.

18. The system of claim 13, further comprising a hydrogen source connected to and in fluid communication with the hydrocracking reactor, the isomerization reactor, or both.

19. The system of claim 13, further comprising a controller in signal communication with the fractionator, the hydrocracking reactor, and the isomerization reactor, and wherein the controller is configured to transmit signals to one or more of the fractionator, the hydrocracking reactor, or the isomerization reactor to adjust production of the aviation fuel product.

20. The system of claim 19, wherein the controller is configured to adjust operation of the fractionator, the hydrocracking reactor, or both in response to detecting that the isomerization reactor is deviating from one or more preselected operating parameter ranges.

* * * * *